United States Patent [19]
Kawamura

[11] Patent Number: 5,967,085
[45] Date of Patent: Oct. 19, 1999

[54] SEA WATER WELL-DRIVEN HEAT EXCHANGE SYSTEM COUPLED TO AN AGRICULTURAL SYSTEM AND AQUACULTURE PRESERVE

[75] Inventor: Bruce K. Kawamura, 675 Kinoole St., Hilo, Hi. 96720

[73] Assignee: Bruce K. Kawamura, Hilo, Hi.

[21] Appl. No.: 08/716,760

[22] Filed: Sep. 23, 1996

[51] Int. Cl.[6] .............................. A01K 63/04; A01G 9/00
[52] U.S. Cl. ......................... 119/215; 119/226; 119/229; 47/59
[58] Field of Search ................................... 119/215, 200, 119/229, 209, 211, 226; 47/59

[56] References Cited

U.S. PATENT DOCUMENTS

| | | | |
|---|---|---|---|
| 3,717,123 | 2/1973 | Regnier | 119/226 X |
| 4,077,158 | 3/1978 | England | 119/226 X |
| 4,258,661 | 3/1981 | Margen | 119/229 |
| 4,726,191 | 2/1988 | Kawamura | 60/641.7 |
| 4,846,107 | 7/1989 | Fenske et al. | 119/226 |
| 5,046,451 | 9/1991 | Inslee et al. | 119/215 X |
| 5,216,976 | 6/1993 | Marinkovich | 119/215 X |
| 5,435,155 | 7/1995 | Paradis | 62/515 |

*Primary Examiner*—Michael J. Carone
*Assistant Examiner*—Yvonne R. Abbott

[57] ABSTRACT

A sea water well source is used to supply cold sea water to a pair of serially connected thermal exchange systems. The sea water outflow from the second system is then supplied to an aquaculture preserve to provide nutrients in the sea water to marine life cultivated in the aquaculture preserve. The first of two heat exchange systems uses the cold sea water to cool a building or refrigeration unit. Alternatively, it may be used to condense fresh water from the air when the sea water is passed through coils. The second of the two heat exchange systems is a temperature-controlled agricultural system which uses the sea water output from the first heat exchange system to maintain the climate so as to grow agricultural products.

10 Claims, 5 Drawing Sheets

SEA WATER WELL-DRIVEN HEAT EXCHANGE SYSTEM COUPLED TO AN AGRICULTURAL SYSTEM AND AQUACULTURE PRESERVE

TECHNICAL FIELD

This invention concerns an apparatus for transferring thermal energy between cold water from a sea water well and a heat exchange system with the outflow from the heat exchange system supplying an agricultural system and an aquaculture preserve.

BACKGROUND

Conventional air conditioning systems consume a great deal of power to maintain low temperatures in most environments. It is not uncommon for an air conditioning system to consume power at a rate of 900 KW per 1000 tons of air conditioning. Most of this power is used in compressing and then expanding a coolant so as to reduce its temperature. The coolant with the reduced temperature is then passed through a heat exchanger which ultimately causes chilled air to be circulated in a target area.

More efficient heat exchangers are also known in the art. Many of these, however, depend on a source of naturally cold coolant. One example of such a coolant in abundance is cold ocean water. Cold ocean water having a temperature anywhere from 2–7° C. is found below the thermocline. To get at this water from shore, prior art Ocean Thermal Energy Conversion (OTEC) systems have employed one or more pipes having an intakes at a depth of 2000 feet or more which extend along the shore line and ocean floor for a distance of about one mile.

Problems with extending pipes such distances from shore into the ocean are well known. An alternative to laying pipe out into the ocean is the use of sea water wells, as disclosed in U.S. Pat. No. 4,726,191 ('191). Such wells can be used as source of cold sea water having a temperature of about 6° C. The '191 patent discloses the use of sea water from such a well for creating thermal energy. The cold sea water enters a heat exchanger at a first, low temperature and exits into an aquaculture preserve at a second, slightly higher temperature.

The temperature of the sea water entering the aquaculture preserve, as taught in the prior art, is still below above air temperature in warmer climates. Therefore, the coolness of this sea water upon exiting the power generation apparatus, may be put to a second use before it is mixed with the water in the preserve. The prior art, however, does not contemplate a second use and so does not exploit the full potential of the cold sea water.

SUMMARY OF THE INVENTION

The present invention is directed to an apparatus which uses water from a sea water well in two, serially arranged heat exchange systems. The sea water from the well enters the first heat exchange system at a first temperature and exits that first heat exchange system at a second temperature higher than the first temperature. The water then enters the second heat exchange system at a third temperature. This second heat exchange system is preferably a controlled-temperature agricultural system comprising a biosphere-type structure, such as a greenhouse, or the like. The sea water helps control the temperature of this second heat exchange system. The sea water then exits this system at a fourth temperature and then is provided to an aquaculture preserve, such as a fishery, which it supplies with nutrients.

In one embodiment of the invention, the first heat exchange system is an air conditioning or refrigeration system. In another embodiment, the first heat exchange system is a system which condenses fresh water from the air.

DETAILED DESCRIPTION OF THE PREFERRED EMBODIMENT

Figure 1:
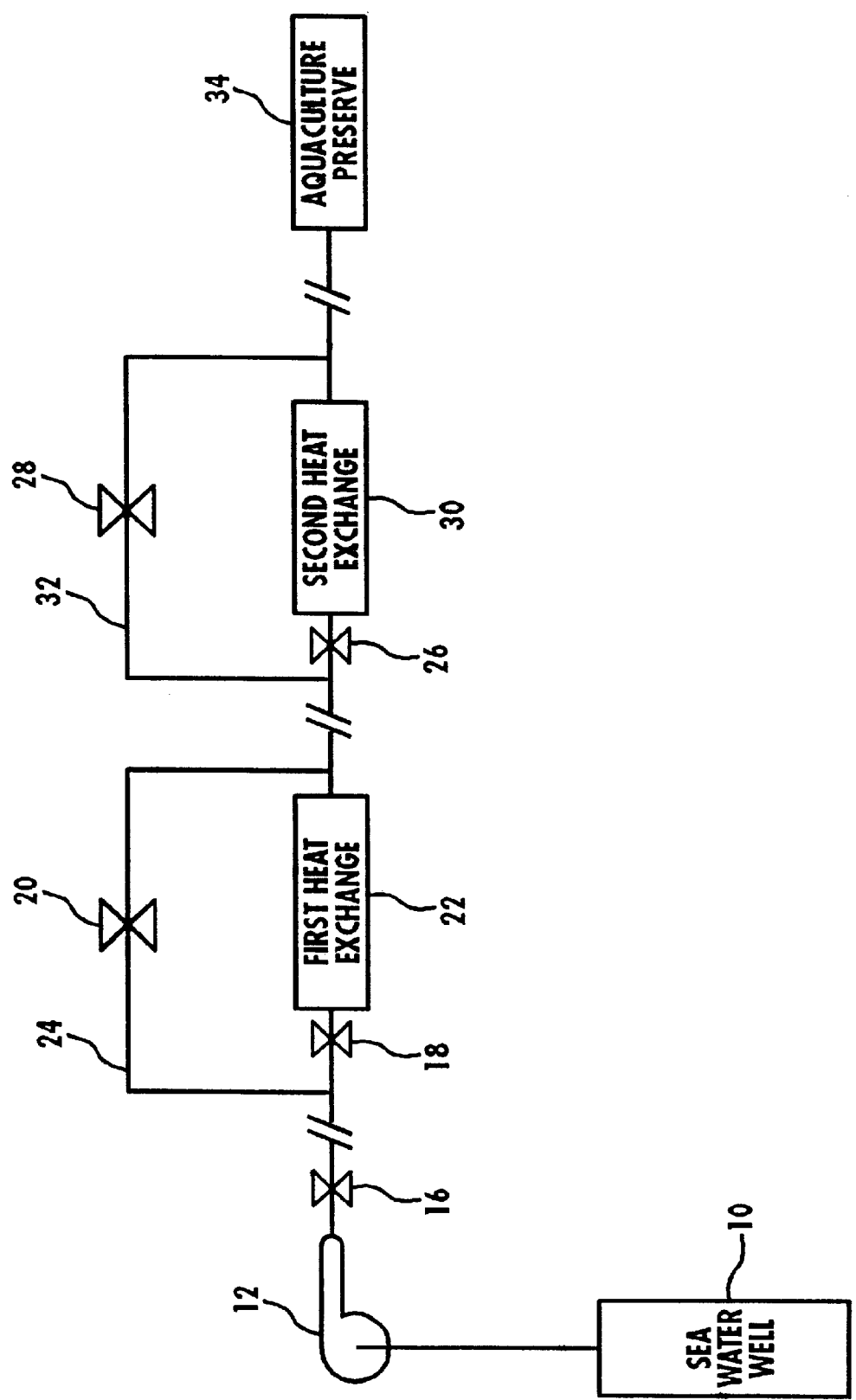
FIG. 1 shows an apparatus in accordance with the present invention comprising a sea water well, a first and a second heat exchange system, and an aquaculture preserve.

FIG. 1 shows an apparatus in accordance with the present invention. It comprises a sea water well 10 similar to the one described in U.S. Pat. No. 4,726,191, whose contents are incorporated by reference. The sea water well 10 supplies cold sea water at a temperature of about 5–7° C. by means of the well pump 12. The sea water passes through valve 16 before entering the system, which preferably comprises discrete units connected by insulated piping. The pump 12 and valve 16 are controlled such that the valve 16 is open whenever the pump is running.

Valves 18 and 20 are also controlled in conjunction with the pump so that at least one of them is open whenever the pump is running. With valve 18 closed and bypass valve 20 open, the sea water bypasses the first heat exchange system via first bypass conduit 24.

With valve 18 open and bypass valve 20 closed, the sea water enters the first heat exchange system 22. The sea water entering the first heat exchange system is at a first, low temperature. While in the first heat exchange system, the sea water gains thermal energy from its surroundings through a combination of radiation, convection and conduction. Thus, the sea water exits the first heat exchange system at second temperature which is a few degrees higher than when it entered.

After passing through either the first heat exchange system 22 or bypass conduit 24, the sea water passes through either valve 26 or bypass valve 28. Again, these two valves are controlled in conjunction with the pump 12. With valve 26 closed and valve 28 open, the sea water bypasses the second heat exchange system via the bypass conduit 32.

With valve 26 open and valve 28 closed, the sea water enters the second heat exchange system 30. As it enters the second heat exchange system, the sea water is at a third temperature. If the sea water first passed through the first heat exchange system, this third temperature is likely to be higher than the aforementioned first temperature. Depending on the length of the piping and any insulation surrounding the piping, this third temperature will be about the same as the aforementioned second temperature.

The second heat exchange system 30 is preferably an temperature-controlled agricultural biosphere, described below. Thus, the second heat exchange system 30 does not require the temperature of the entering sea water to be as cold as that entering the first heat exchange system 22. Instead, it makes use of the residual coolness of the sea water which, though warmer than it was before entering the first heat exchange system 22, is still cooler than the surrounding atmosphere. From the second heat exchange system 30, the sea water enters an aquaculture preserve 34, as disclosed in the '191 patent. The sea water provides nutrient value for marine life being cultivated in the aquaculture preserve.

Figure 2:
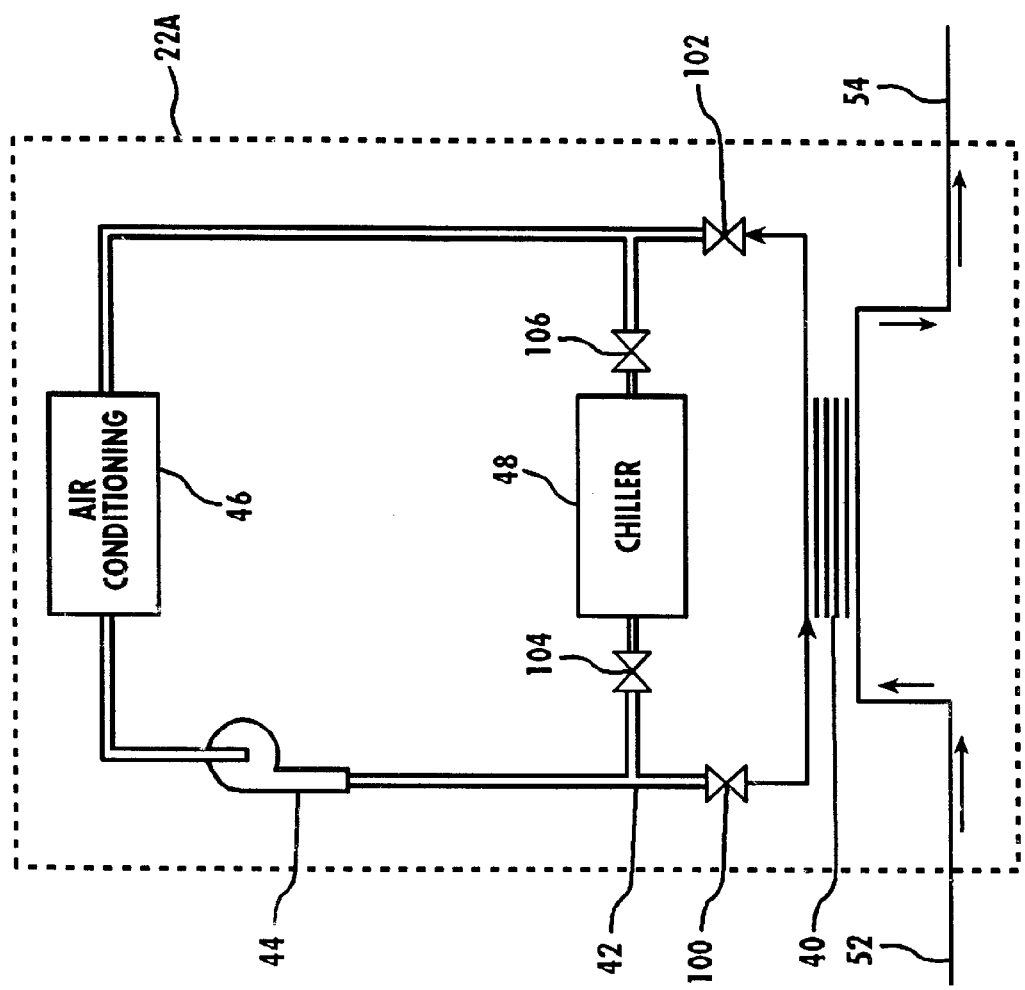
FIG. 2 shows an embodiment of the first heat exchange system of FIG. 1 formed as an air conditioning system.

FIG. 2 shows one embodiment in which the first heat exchange system 22 comprises an apparatus 22A for air conditioning a building 46 or the like. In this embodiment, the sea water enters this system at a temperature of about 5–7° C. through insulated inlet pipe 52 and exits at a temperature of about 10–12° C. through insulated outlet pipe 54. A heat exchanger 40 may be provided for the sea water to cool a circulating coolant loop 42. As is known to those skilled in the art, heat exchanger 40 may comprise a pair of intertwined coils, or the like. With valves 100, 102 open, the circulating coolant can be brought down to a temperature within a degree or so of the temperature of the sea water.

The circulating coolant loop 42 comprises a circulation pump 44 for forcing the coolant through the loop. The coolant cools an air conditioning system of a building 46. An optional chiller unit 48 may also be provided in parallel with the heat exchanger 40. Alternatively, the chiller unit 48 may be placed in series with the heat exchanger 40.

The chiller unit 48 is not essential to the air conditioning system of the building 46. Therefore, the chiller unit can either be completed eliminated from the design or selectively used by means of valves 104, 106.

Instead of having a circulation loop 42 with a different coolant, the sea water may instead be supplied directly to the air conditioning system of the building 46. In such case, neither the chiller unit 48 nor the heat exchanger 46 are needed in the system 22A. Such a direct-cool arrangement may be advantageous when the building is small.

Figure 3:
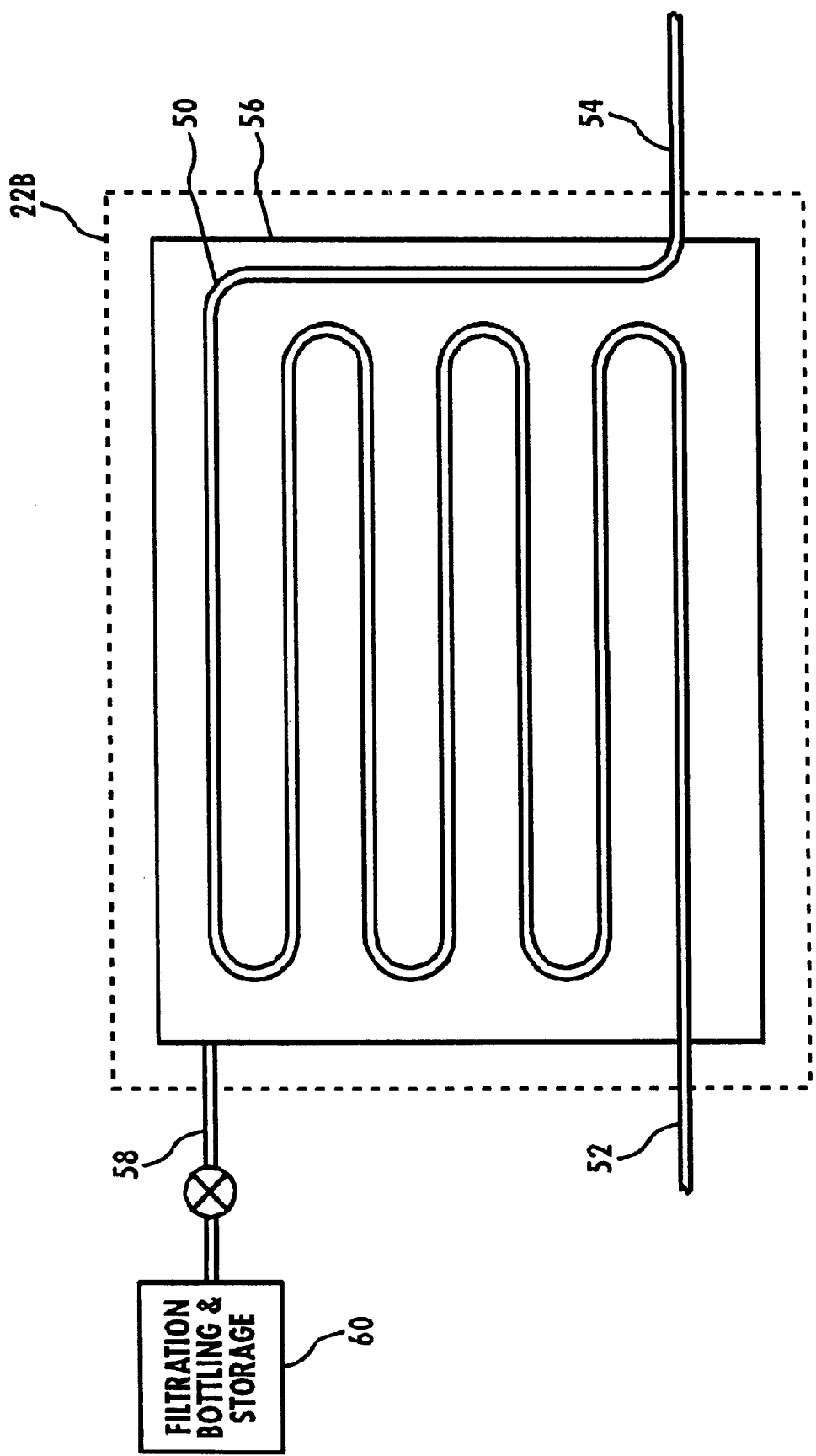
FIG. 3. shows an embodiment of the first heat exchange system of FIG. 1 formed as a fresh water condenser.

As shown in FIG. 3, an alternative for the first heat exchange system 22 is a system 22B which condenses fresh water from the air. In such case, the sea water enters a set of coils 50 through an insulated inlet pipe 52 at a first temperature. The coils 50 are typically formed from copper, aluminum, polyethylene, titanium, or any other non-toxic pipe material. The coils 50 exchange heat between the surrounding air and the sea water and condensate forms on the surface of the coils. Thus, the sea water exits the coils through insulated outlet pipe 54 with a higher temperature than when it entered. The sea water exiting the coils can then be passed on to an agricultural system and then on to an aquaculture preserve 34 previously described.

As is known to those skilled in the art, condensate forms on the coils as the sea water passes through the coils. To capture this condensate, the coil are placed over a collection tray 56 which catches the condensate. This condensate comprises fresh water which exits the tray 54 through conduit 58. The fresh water can then be sent on to conventional filtration, bottling and storage facilities 60. Using a fresh water condenser as the first heat exchange system is especially advantageous in areas where sea water wells can be dug and humidity levels are 60% or higher.

Figure 4:
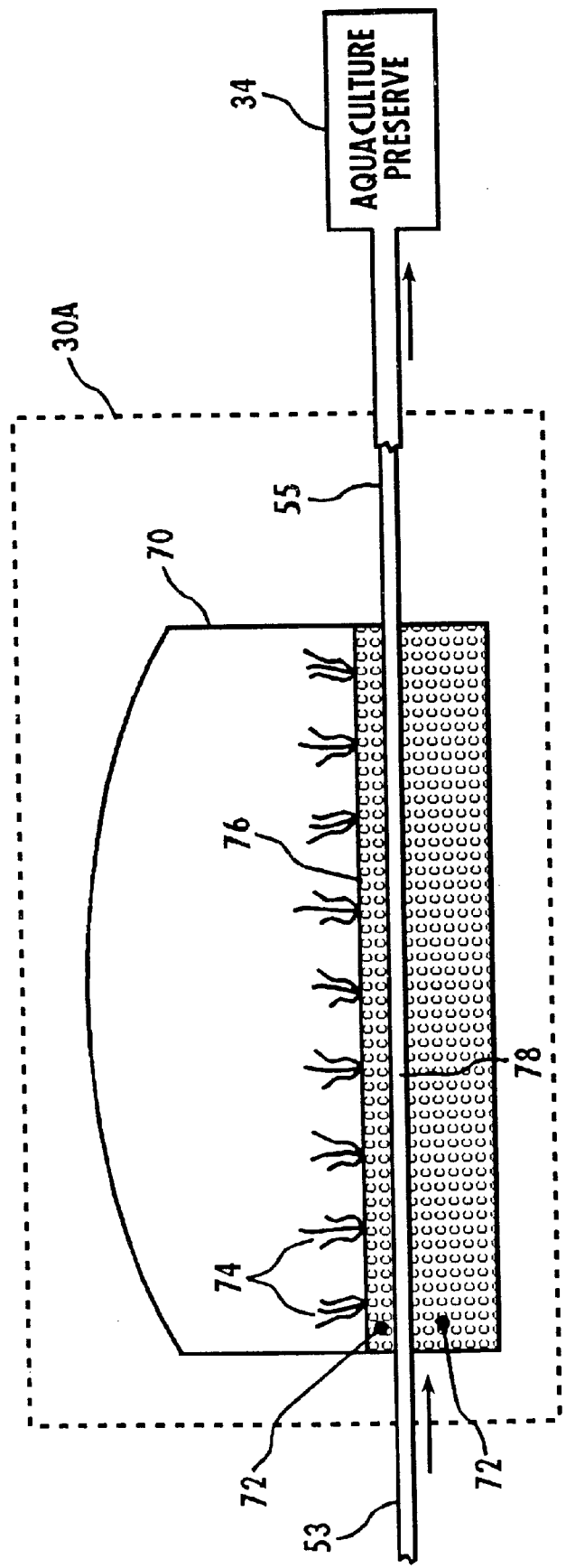
FIG. 4. shows an embodiment of the second heat exchange system formed as a biosphere-type structure with agricultural beds.

FIG. 4 shows an embodiment in which the second heat exchange system 30 comprises a temperature-controlled agricultural system 30A. The agricultural system 30A further comprises a biosphere-type structure 70 such as a greenhouse of the like. Within the biosphere are agriculture beds 72 in which crops 74 are grown. The sea water enters the system 30A at a third temperature through insulated pipe 53 and exits at a fourth temperature through insulated outlet pipe 55. Typically, the sea water will be slightly warmed as it cools the agriculture beds 72.

The sea water passes through the beds 72 at a predetermined distance below their surface 76 in an in-bed pipe 78, thus controlling the beds' 72 temperature. By controlling the temperature of the beds 72, the growing seasons can be created artificially so as to increase the output of agricultural products. This arrangement also allows one to grow agriculture products normally requiring cooler climates, to be grown in the tropics.

Figure 5:
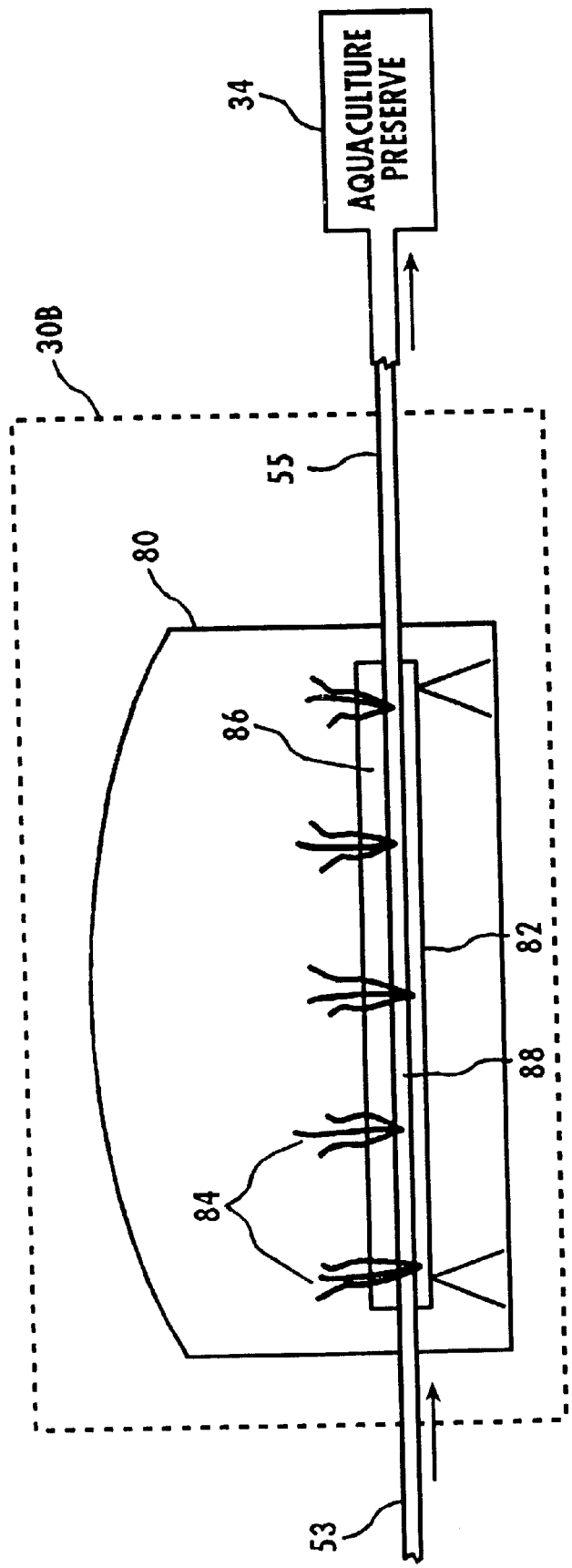
FIG. 5. shows an embodiment of the second heat exchange system formed as a biosphere-type structure having hydroponic-based agriculture.

FIG. 5 shows a variation of the embodiment show in FIG. 4. FIG. 5 depicts an another temperature controlled agricultural system 30B. This system 30B also has biosphere-type structure 80. Here, the second structure is provided with a hydroponic water trough 82, rather than soil, for growing crops 84. The hydroponic water trough is filled with nutrient-laden water 86 for feeding and irrigating the crops 84. The sea water enters the system 30B at a third temperature and exits at a fourth temperature, being slightly warmed as it cools the nutrient-laden water 86. The sea water passes through nutrient-laden water 86 in an in-trough pipe 88, cooling the nutrient-laden water 86 in which the crops' roots are bathed. Thus, the same advantages realized with the agriculture beds are realized: the growing seasons can again be created artificially to increase yield and products requiring a cooler climate can be grown in warm areas. In either the embodiment of FIG. 4 or FIG. 5, the outflow from the biosphere system is sent on to the aquaculture preserve 34.

While the present invention has been disclosed with reference to certain preferred embodiments, it is emphasized that the preferred embodiments are not the only possible structures or purposes which can be served with the benefits of the present invention. For instance, the air conditioning system of the building of FIG. 2 may just as easily be a large refrigeration unit, a cave, or even another enclosed biosphere. The true scope of the present invention is defined by the claims set forth below.

What is claimed is:

1. In combination:
   a sea water well supplying sea water at a first temperature;
   a first heat exchange system having a first inlet receiving said sea water at said first temperature and a first outlet outputing said sea water at a second temperature;
   a second heat exchange system serially connected to said first heat exchange system, said second heat exchange system having
      a second inlet receiving said sea water at a third temperature, said second inlet being connected to said first outlet of said first heat exchange system, and
      a second outlet outputing said sea water at a fourth temperature; and
   an aquaculture preserve receiving said sea water from said second heat exchange system, said sea water providing nutrient value for marine life cultivated in said aquaculture preserve,
   wherein the first heat exchange system comprises an air conditioning system cooled by the sea water.

2. The combination of claim 1 wherein the sea water exchanges thermal energy with a coolant circulating in a coolant loop to cool said air conditioning system.

3. The combination of claim 2, further comprising a heat exchanger for facilitating the exchange of heat between the sea water and the circulating coolant in said coolant loop.

4. The combination of claim 2 further comprising a chiller unit arranged in parallel th said air conditioning system in said loop.

5. The combination of claim 4 further comprising a first pair of valves arranged on either side of the chiller unit to control a flow of coolant therethrough.

6. The combination of claim 2 wherein said second heat exchange system comprises an agricultural biosphere, said sea water cooling a medium in which agricultural products are grown.

7. In combination:

a sea water well supplying sea water at a first temperature;

a first heat exchange system having a first inlet receiving said sea water at said first temperature and a first outlet outputing said sea water at a second temperature;

a second heat exchange system serially connected to said first heat exchange system, said second heat exchange system having
 a second inlet receiving said sea water at a third temperature, said second inlet being connected to said first outlet of said first heat exchange system, and
 a second outlet outputing said sea water at a fourth temperature; and an aquaculture preserve receiving said sea water from said second heat exchange system, said sea water providing nutrient value for marine life cultivated in said aquaculture preserve, wherein said second heat exchange system comprises an agricultural biosphere, said sea water cooling a medium in which agricultural products are grown.

8. The combination of claim 7 wherein said medium is an agricultural bed, agricultural products growing in said bed, temperature of said agricultural bed being controlled by said sea water.

9. The combination of claim 7 wherein said medium is water, agricultural products growing hydroponically in said water, temperature of said water being controlled by said sea water.

10. In combination:

a sea water well supplying sea water at a first temperature;

a first heat exchange system having a first inlet receiving said sea water at said first temperature and a first outlet outputing said sea water at a second temperature;

a second heat exchange system serially connected to said first heat exchange system, said second heat exchange system having
 a second inlet receiving said sea water at a third temperature, said second inlet being connected to said first outlet of said first heat exchange system, and
 a second outlet outputing said sea water at a fourth temperature; and an aquaculture preserve receiving said sea water from said second heat exchange system, said sea water providing nutrient value for marine life cultivated in said aquaculture preserve, wherein the first heat exchange system comprises a fresh water condenser through which said sea water passes, and wherein said second heat exchange system comprises an agricultural biosphere, said sea water cooling a medium in which agricultural products are grown.

\* \* \* \* \*